Re. 24450
March 1, 1955      A. J. SARNO      2,703,023
DIE-CUTTING APPARATUS AND METHOD OF PRODUCING SAME
Filed May 20, 1953      2 Sheets-Sheet 1
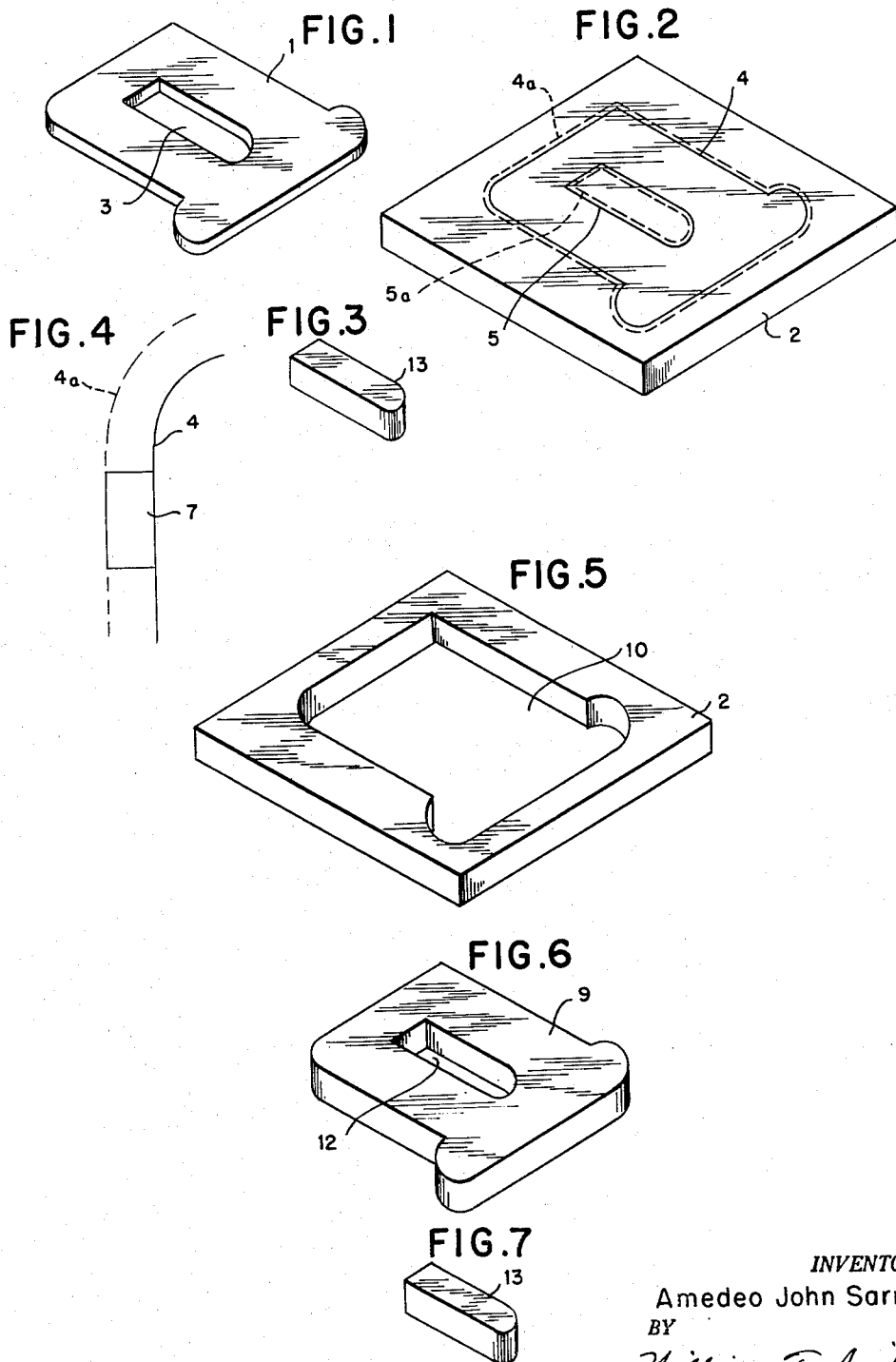
INVENTOR.
Amedeo John Sarno
BY
William F. Nickel
ATTORNEY

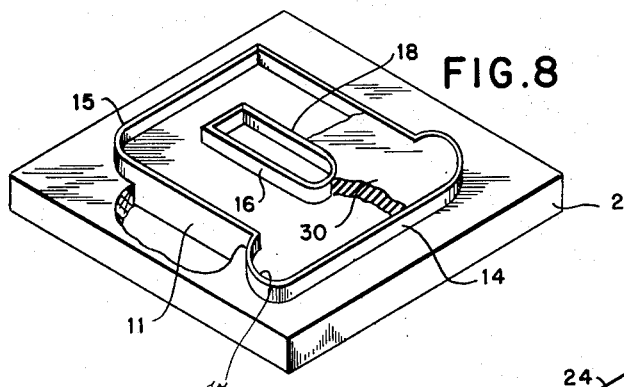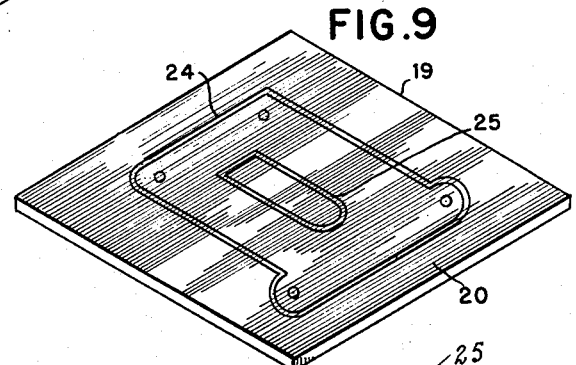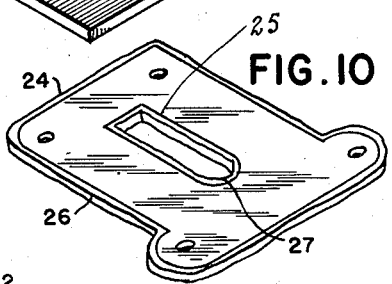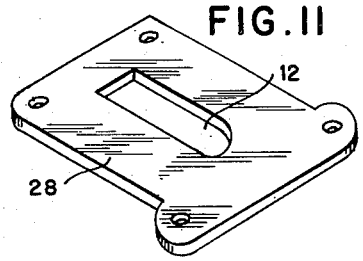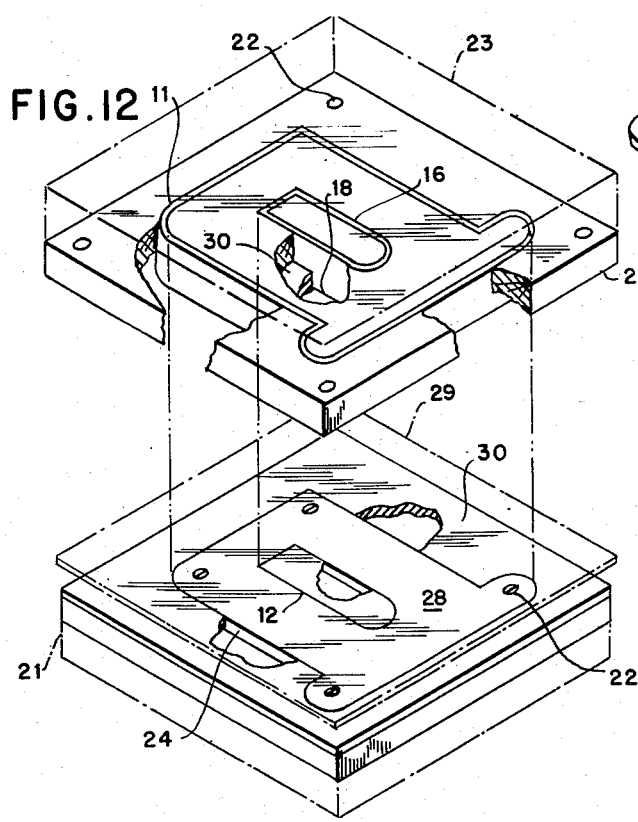

United States Patent Office 2,703,023
Patented Mar. 1, 1955

2,703,023

DIE-CUTTING APPARATUS AND METHOD OF PRODUCING SAME

Amedeo John Sarno, Oceanside, N. Y.

Application May 20, 1953, Serial No. 356,174

1 Claim. (Cl. 76—107)

This invention is an improvement in die-cutting apparatus; particularly die-cutting apparatus for blanking out pieces of metal having a special form and thickness, by shearing them from metal stock with dies comprising steel blades or strips bent to enclose an outline corresponding to the shape of the pieces to be obtained.

An important object of this invention is to provide a die of superior construction and efficiency, and a novel method of preparing and assembling the die and operating it in practice.

Another object is to provide die-cutting apparatus which can be inexpensively designed and easily and quickly made ready for use, and caused to work upon metal stock in a manner that fully prevents impairment of the material and delivers pieces that are quite smooth and finished, without burrs or other rough portions and structurally sound throughout.

And it is a special object of my invention to devise a method and means for producing apparatus that will make die-cut pieces which are always of virtually the exact size required in all their dimensions, wholly without rough or partly bent edges, and free from minute cracks and fissures over their entire area and extent.

A further object is to provide die-cutting apparatus in which the cutting edges are highly durable, and in which the liability of deformation and impairment is altogether obviated.

These and other objects and the nature and advantages of the invention are fully described in the ensuing specification, and the characteristics of my improvements are defined in the appended claim. On the drawings a preferred construction is illustrated, but I do not wish to be narrowly limited to what the drawings set forth. In practice, variations in structural details and in other minor respects may be adopted without deviation from the general plan in which the invention resides.

On the drawings:

Figure 1 shows a piece of metal of given outline, for which die members are to be fashioned.

Figure 2 shows in plan the first step in the making of a die cutting member according to my invention.

Figures 3 and 4 show on an enlarged scale details in such an operation.

Figures 5, 6 and 7 are perspective views of further steps in the formation of such a die member.

Figure 8 shows in perspective the completed die member.

Figure 9 shows the first step in the preparation of a matching or cooperating die member.

Figures 10 and 11 indicate the next steps in the making of the matching die member; and Figure 12 is a perspective view of said die members in relative positions for operation.

At the start, an outline enclosing an area of the same form as a piece or pattern 1 to be die-cut, said piece having the shape required, is drawn upon a base member such as a block 2 of plastic or wood; for example, maple plywood, which answers the purpose very well. The periphery of the piece 1 may be smooth along the outer edges or have sharply defined projections or recesses, or both, and its surface may be continuous or present one or more openings 3. The pattern 1 may be laid on the block or plate 2, and the peripheral outline 4, which must be clear, fine and sharp, is traced on the block 2 closely around the edges of the pattern, by a pointed implement, not shown. The enclosed area must always be of exactly the same size as the piece to be die-cut, and this area or portion enclosed within the outline 4 is then cut free and removed. The thickness of the steel blades or cutting strips, such as appear at 11 in Figure 8, to be used, must be taken into account. For example, if the blades are .032 inch thick, the cutting must be done along a space between the broken line 4a and the full line 4, and this space will have a constant width of 0.32 inch throughout. The block or member 2 is cut by a jig saw which moves along the outer side of line 4, and takes away as much of said line 4 as possible.

This operation is indicated diagrammatically on an exaggerated scale in Figures 2 and 4. Here the space between the line 4a and the outline 4 around the piece is illustrated as having a width equal to the thickness of the jig saw blade indicated at 7 which makes its incision in the block 2 with one face flush with the line 4, and the other flush with the line 4a. The saw 7 has the thickness of the blades for the die (.032 inch in the example given) and does its cutting along the two lines 4 and 4a, and the distance between the two lines 4 and 4a represents the allowance calculated for the thickness of the die-cutting elements or blades to be set into the block 2.

The cut-out section 9 is now removed, and the aperture 10 left in the block 2 now has the same shape as the piece 1 to be formed, but is somewhat larger. The next step is to line the edges of the opening closely with steel strips or blades 11 in one piece, or in separate lengths or sections, to serve as the shearing elements of the die. These blades are bent to conform fully to the outline of the aperture 10, and when all are in position, the section 9 is replaced. As this section has the same dimensions across it at all points as the piece to be produced, the cut-out section fits within the blades 11 tightly and binds all the members 11 between the cut-out portion 9 and the remainder of thre plywood 2. The blades 11 may be in sections.

In case the piece 1 has an opening 3 of any shape, the cut-out section 9 will be worked to present a corresponding opening or aperture 12. To this end the block or member 2 is marked with a line 5 representing the opening, and of exactly the same size, and the block 2 is further cut by a jig saw along the space defined by this line and the parallel line 5a within it. The cut-out part 13 is smaller all around than the opening 3 in the section 9 by an amount equal to the thickness of the saw, as before, and the saw employed for this step will have the same thickness as the blades 16 which are to be used to line the opening 12, in the manner described above with reference to the aperture 10 and section 9. The cut-out part 13 is of course replaced in the portion 9 when the blades 16 for the opening 12 are in position and holds the blades 16 securely in the opening 12. The space enclosed by the blades 16 will be smaller than the opening 3, but the opening 12 plus the thickness of the blades in the opening 12 will cover an area exactly the same as the aperture 3.

All of the blades are flush along one edge with the lower face of the block 2, but wide or high enough to project up about a quarter inch from the top face of the block along their opposite edges which are of course all flush with one another. The opposite edges are of course also flush with one another. The blades or shearing elements 11 and 16 have smooth side faces 14, but their outer projecting edges are really narrow surfaces 15 that are at right angles to the surfaces 14. The inner corners 17 of the blades surrounding the section 9 and the outer corners 18 of the blades 16 in the opening 12 do the actual shearing. The blades are therefore rugged and durable and will serve without deformation over long runs in real work. If necessary they can be specially hardened or resharpened. The blades protrude from the block as far as required.

Hence when the die member comprising the strips 11 surrounding the periphery of the section 9 and the strips or blades 16 in the portion 13 are actually pressed against a sheet of flat metal stock, the piece cut out by this member will have the exact shape as the pattern 1 with the aperture 3, and the exact size also at all points.

When the above described die member is complete it will serve as the so-called female die member, and a matching or male die member is needed. To make a cooperating die member, a piece of flat metal 19 is given a coating of a substance such as layout blue, indicated at 20. This piece is secured to the bed plate 21 of a die press, with screws 22 entering holes in the piece 19 and in said bed to indicate and fix the position of said piece 19; and the block 2 with the blades 11 and 16 is secured to the lower face of the head 23 in the die press, also by engaging similar holes in the block 2 and in the head. The head is now depressed and the blades 11 and 16 mark outlines 24 and 25 respectively on the coating 20. The plate 19 is now removed and trimmed closely but roughly around the outlines 24 and 25 made by the right angled corners along the edges 15 of the blades, but the trimming is done only up to the outline and not touching it, as shown in Figure 10. The trimmed piece 19 is then put back on the bed 21, in the same position as before by means of the screws 22. The small rough strips 26 and 27 along the edges of the outlines 24 and 25 are now cut away by the blades 11 and 16 when the head 23 is again depressed, and the sharp and clean outline of the piece 19 makes the male die member 28 matching the other die member perfectly. In this and all subsequent steps the die member as shown in the Figure 8 is inverted and affixed to the head 23 with the blades 11 and 16 projecting downward as shown in Figure 12.

The member 28 is mounted on the bed plate and the screws 22 in the same holes to secure it in exact working position. The working face of the base 2, between the blades 11 and 16 is covered with a flat sheet of rubber 30, or cork or suitable ejection device, or pieces of rubber engaging the opposing faces of these blades at various separated points, and the said piece forming the male die 28 is surrounded by a flat sheet of rubber 30 or pieces thereof. See Figures 8 and 12. All the rubber has the outer face thereof flush with the outer or upper edges of the blades 11 and 16, and with the upper face of the member 28. The opening 12, in the member 28 which has the same size as the opening 3 in the pattern is also filled with sheet rubber 30 flush with the surface of the member 28. A piece of stock 29 is then laid on the die 28 and when the head 23 is lowered a cleanly cut piece of the exact size and form as the pattern 1 results. Its surfaces on both sides are perfectly flat, not bent over, rough or uneven along the inner or outer edges, and with no small invisible cracks or fissures at any point whatever. When the head is raised the expansion of the compressed rubber 30 around and in the male die 28 frees the piece cut from the stock 29 so that it can easily be removed.

The vertical dot-and-dash lines in Figure 12 indicate how the blades 11 envelop the outer member 29 around its outer edges and how the blades 16 fit within the opening 12.

Having described my invention, what I believe to be new is:

The method of producing a cutting die which consists in tracing a line on a base member to enclose an area having the size, shape and outline of a pattern, making an incision along said line throughout its length of a width equal to the thickness of a die blade, inserting one or more die blades in said incision and making said blades fast to said member, covering a piece of material with a soft coating, securing said piece to a stationary plate in a press, attaching said member bearing said blades enclosing said outline to a movable head in said press opposite said piece, moving said member into position to imprint said outline on said piece, removing and trimming said piece around said outline, so that it can be closely enveloped by said blades, and replacing said piece on said plate in its exact former position, so that said blades and said piece can cut stock placed between them.

References Cited in the file of this patent

UNITED STATES PATENTS

| | | |
|---|---|---|
| 163,674 | McKenzie | May 25, 1875 |
| 344,822 | Fiske | July 6, 1886 |
| 1,012,992 | Davis | Dec. 26, 1911 |
| 1,082,986 | Wilder et al. | Dec. 30, 1918 |
| 1,701,545 | Shaw | Feb. 12, 1929 |

FOREIGN PATENTS

| | | |
|---|---|---|
| 126,836 | Australia | Feb. 13, 1948 |